Aug. 1, 1939.   A. M. COLLOT   2,168,115
REPAIR BRACKET SUPPORT FOR LAWN MOWERS
Filed July 16, 1938   2 Sheets-Sheet 2
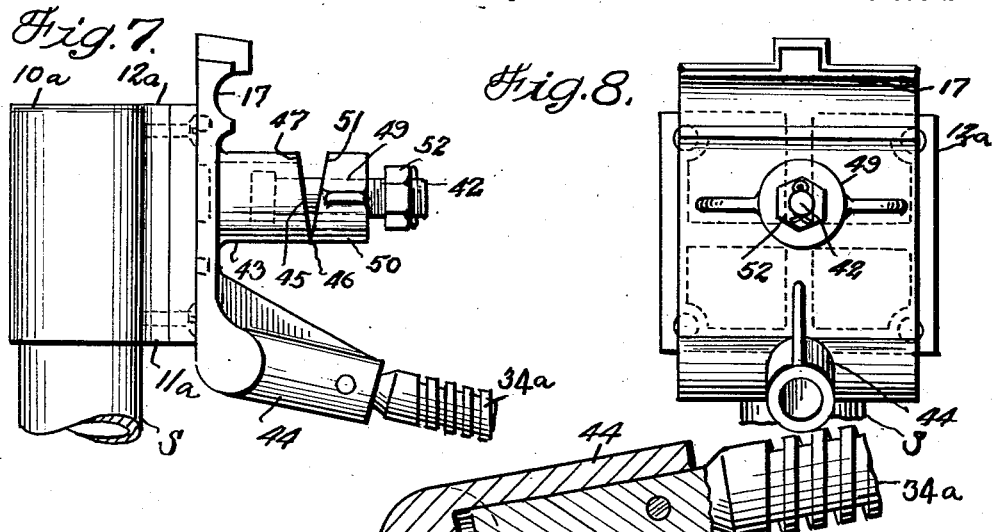
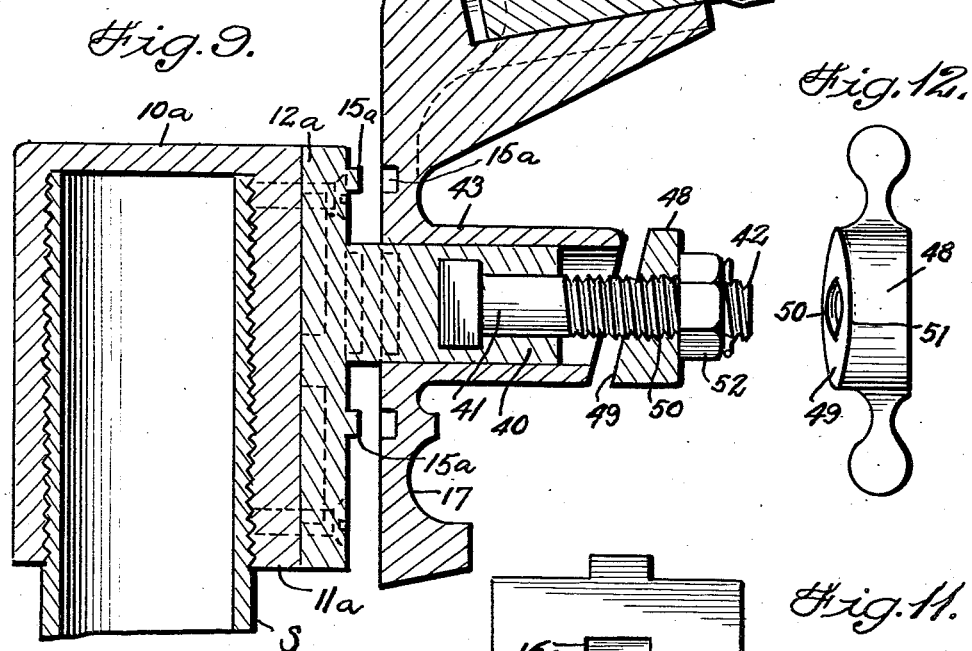
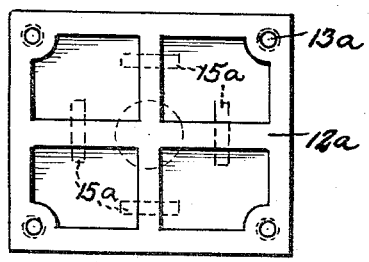
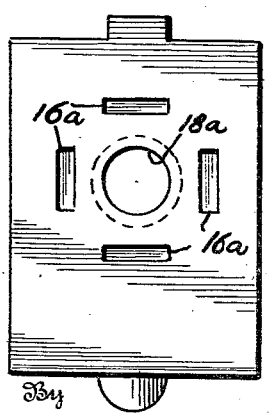
Inventor
Arthur M. Collot.

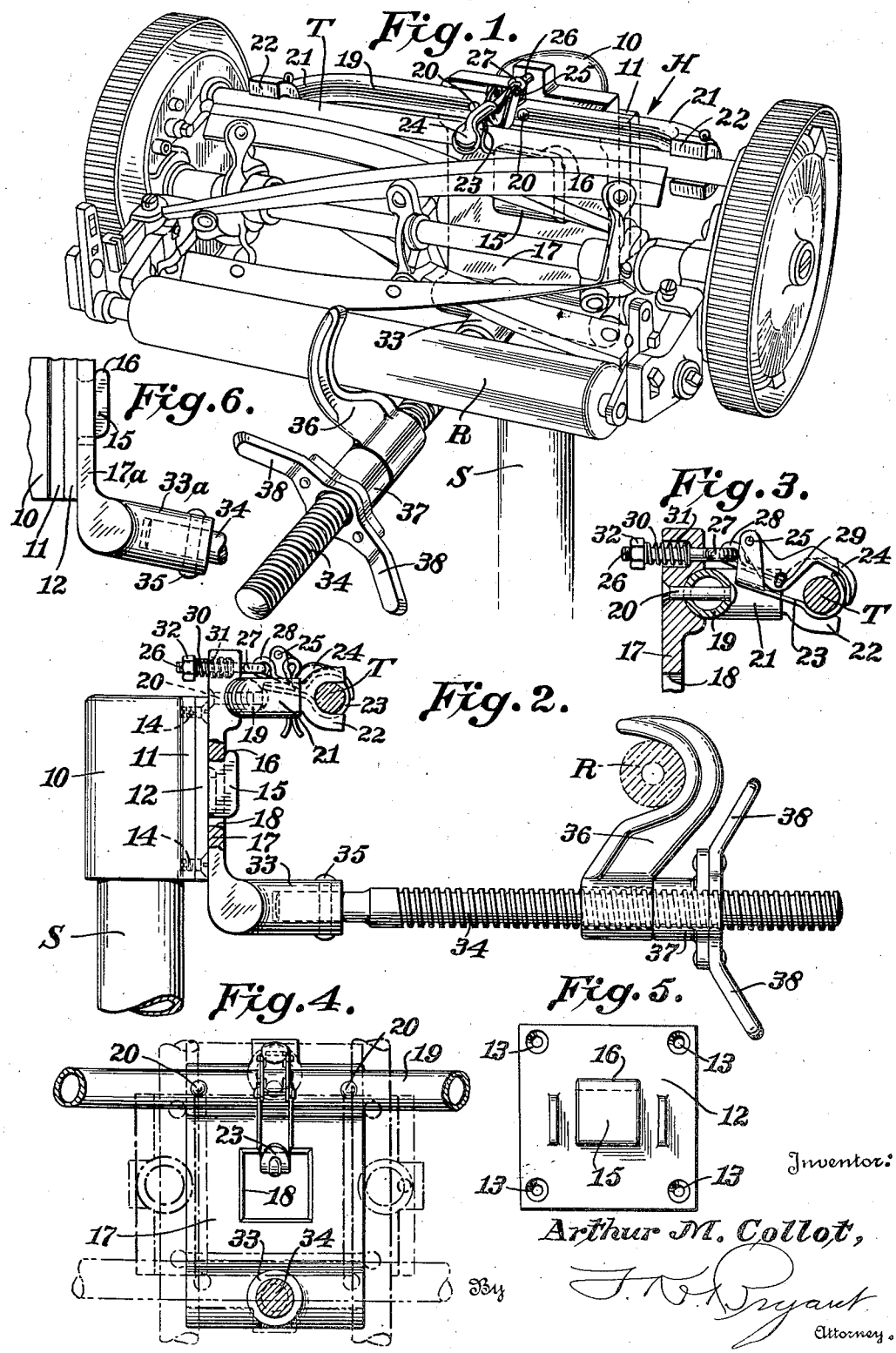
Aug. 1, 1939.  A. M. COLLOT  2,168,115
REPAIR BRACKET SUPPORT FOR LAWN MOWERS
Filed July 16, 1938  2 Sheets-Sheet 1
Inventor:
Arthur M. Collot,
Attorney.

Patented Aug. 1, 1939

2,168,115

UNITED STATES PATENT OFFICE 2,168,115

REPAIR BRACKET SUPPORT FOR LAWN MOWERS

Arthur Marvin Collot, Miami, Fla.

Application July 16, 1938, Serial No. 219,636

10 Claims. (Cl. 51—217)

This invention relates to certain new and useful improvements in repair bracket support for lawn mowers.

The primary object of the invention is to provide a repair bracket support for lawn mowers embodying elements for clamping the head or lawn mower mechanism in position thereon, preferably at the upper end of a standard so that access to the operating mechanism of the lawn mower may be had while the repair man is in a standing position, the mower being rigidly supported during repair work or adjustment thereon.

A further object of the invention is to provide a repair bracket support for lawn mowers of the foregoing character wherein a bracket plate embodying clamp elements for holding the head of a lawn mower is adjustably mounted upon a standard in a manner to present the front or rear side of the mower head, or the ends thereof in an upright position for ready access to the repair man, the bracket support presenting the lawn mower head with all of its operating mechanism in clear view of the repair man and at a convenient elevation from the ground.

With the above and other objects in view that will become apparent as the nature of the invention is better understood, the same consists in the novel form, combination and arrangement of parts hereinafter more fully described, shown in the accompanying drawings and claimed.

In the drawings:

Figure 1 is a pictorial perspective view of the head of a lawn mower mounted in clamped position upon the upper end of a standard by means of a repair bracket support;

Figure 2 is a vertical longitudinal sectional view of the bracket support, the tie rod and ground roller of the lawn mower being illustrated in clamped position and in cross-section with the bracket support mounted upon the upper end of a standard;

Figure 3 is a detail sectional view showing the resilient clamping device carried by the bracket support for the tie rod of the lawn mower head;

Figure 4 is a front elevational view of the bracket plate of the bracket support showing the tie rod of the lawn mower head at the upper end of the bracket plate and further illustrated by dotted lines at the bottom and opposite side edges of the bracket plate;

Figure 5 is a front elevational view of the mounting plate adapted to be secured to the upper end of a standard for receiving the bracket plate of the support;

Figure 6 is a fragmentary side elevational view of the bracket support showing the arm carried by the bracket plate declined downwardly;

Figure 7 is a fragmentary side elevational view, similar to Figure 2, showing another construction for securing the bracket plate in position on the standard;

Figure 8 is a front elevational view of the devices shown in Figure 7;

Figure 9 is a fragmentary vertical longitudinal sectional view showing the bracket plate in its released position;

Figure 10 is a rear elevational view of the supporting plate;

Figure 11 is a rear elevational view of the bracket plate; and

Figure 12 is a side elevational view of the winged nut having a cam face for moving the bracket plate to anchored position.

A lawn mower head H is pictorially illustrated in Figure 1 as mounted upon the upper end of a standard S and in position to facilitate assembling, dis-assembling, sharpening and other repair work and the lawn mower head that is of the usual construction comprises a frame having a tie rod T and the usual wood roller R.

The standard S is provided at its upper end with a head 10 having a flattened wall 11 at one side thereof that is substantially rectangular in elevation and to which a supporting plate 12 shown in detail in Figure 5 as having corner openings 13 therein is mounted by means of screws or the like 14 passed through said openings 13 and entering the flattened wall 11, said supporting plate also being preferably rectangular in elevation as illustrated. A rectangular-shaped supporting lug 15 is carried by and offset from the outer face of the supporting plate 12 and at the upper outer edge thereof carries an upstanding lip 16 spaced from the outer face of the plate 12.

The repair bracket support for the lawn mower comprises a bracket plate 17 having a centrally disposed rectangular opening 18 therein that is adapted to be received on the lug 15 for the support of the bracket plate 17 upon the supporting plate 12 at the upper end of the standard S, the upper wall of the opening 18 being positioned rearwardly of the upstanding lip 16 on the lug 15 for retaining the bracket plate 17 in position. As shown in Figure 2, the bracket plate 17 is of a length to extend above and below the upper and lower edges respectively of the supporting plate 12 and devices are associated with the upper and lower edges of the bracket plate 17 for rigidly supporting the lawn mower head H thereon.

A horizontal arm 19 is anchored intermediate its ends as at 20 to the outer side of the bracket plate 17 adjacent its upper end and extends laterally of said plate 17 with the ends of the arm 19 directed forwardly as at 21 away from the plate 17, the arm 19 being preferably of tubular formation and carrying at each forwardly directed end thereof a U-shaped strap or clamp 22 that receive and are engaged with the adjacent side of the tie rod T of the lawn mower head H as shown in Figure 1.

A resilient clamp is engaged with the tie rod T of the lawn mower head H midway the ends of said tie rod for cooperation with the U-shaped straps or clamps 22 for holding the lawn mower head H in position on the bracket support. The resilient clamp comprises a pair of clamping jaws 23 and 24 having the gripping ends thereof overlapping each other and adapted to enclose the tie rod T as shown in Figure 3, while the other ends of the clamping jaws 23 and 24 are pivotally connected together as at 25. A threaded I-bolt 26 is freely mounted to extend through the upper end of the bracket plate 17 with the eye 27 at the forwardly projecting end of the I-bolt 26 being engaged with one end of a strap 28 that has its other end attached to a pin 29 carried by the upper jaw 24 at a point below the pivotal connection 25 between the two jaws. A coiled spring 30 surrounds the rearwardly projecting end of the I-bolt 26 with the forward end of the spring 30 extending into a socket 31 in the rear face of the upper end of the bracket plate 17, the rear end of the spring 30 being engaged by the adjustable nut 32 for tensioning the spring as well as exerting a pull on the upper jaw 24 for holding the two jaws 23 and 24 in clamping engagement with the tie rod T.

As shown in Figure 2, a socket member 33 projects forwardly and at right angles from the lower end of the bracket plate 17 below the supporting plate 12 and has one end of a screw shaft 34 anchored therein as at 35. A clamp arm 36 is freely slidable upon the screw shaft 34 and is adapted for engagement with the roller R of the lawn mower head. To move the arm 36 into binding or clamping engagement with the roller R and for cooperation with the resilient clamp and the U-shaped straps or clamps 22 for the rigid support of the lawn mower head H, a follower nut 37 is threaded onto the outer end of the screw shaft 34 outwardly of the clamp arm 36 and is provided with an operating handle 38 for threading the follower nut 37 over the shaft and for moving the clamping arm 36 into binding engagement with the roller R, as shown in Figures 1 and 2.

It is preferable however, as illustrated in Figure 6 to dispose the socket member 33a carried by the bracket plate 17a in a slightly declined position, preferably at a 10° angle from the horizontal to accomplish a better support for the lawn mower head 8 when working thereon.

With the lawn mower head H supported on the bracket plate 17 by means of the clamp devices above described, it will be observed from an inspection of Figure 4 that the bracket plate 17 carrying the lawn mower head H may be disengaged from the supporting plate 12 and re-engaged therewith and illustrated by dotted lines so that the upper and lower sides of the lawn mower head as well as opposite ends thereof may be presented in an upward direction for work thereon.

In the form of invention illustrated in Figures 7 to 12, another form of attachment is provided for mounting the bracket plate 17, shown in Figure 2, onto the supporting plate 12 carried by the head 10 at the upper end of the post S. The head 10a as shown in Figures 7 to 12 upon the upper end of the post S has a side flat wall portion 11a upon which the supporting plate 12a is mounted with anchor screws passing through the corner openings 13a and into the flat wall portion 11a. The outer face of the supporting wall 12a is provided with diametrically opposite pairs of ribs 15a with the ribs of each pair respectively extending horizontally and vertically as shown by dotted lines in Figure 10. A stub shaft 40 facially projects at right angles from the supporting plate 12a centrally of the ribs 15a and said stub shaft has cast into its outer ends, the headed end of a screw bolt 41 that has its threaded shank 42 projecting beyond the outer end of the stub shaft 40.

The bracket plate 17a has a central tubular bearing projecting at right angles from one side thereof for support on the stub shaft 40 and the other face of said bracket plate 17a is provided with diametrically opposite pairs of elongated recesses 16a outwardly of the tubular bearing 43 for selective interlocking reception of the ribs 15a on the supporting plate 12a. A socket member 44 is carried by one edge of the bracket plate 17a and extends at an angle therefrom for the reception of one end of a screw shaft 34a with which a part of the clamping mechanism for the lawn mower head is associated.

As shown more clearly in Figures 7 and 9, the outer end of the tubular bearing 43 is cut at an angle as at 45 to provide high and low ends 46 and 47 respectively at the outer end of said bearing. A winged nut 48 is threaded onto the outer end of the threaded shank 42 of the screw bolt 41 carried by the stub shaft 40 and the inner face of said winged nut 48 is cut on an incline as at 49 to provide high and low points 50 and 51 respectively, unthreading movement of the winged nut 48 on the threaded shank 42 being limited by the lock nut 52 threaded onto the outer end of the threaded shank 42. When the winged nut 48 is in the position shown in Figure 9, the tubular bearing 43 carried by the bracket plate 17a has limited sliding movement on the stub shaft 41 and free rotating movement on said stub shaft for selectively positioning the bracket plate for the desired location of the lawn mower head supported thereon and a turn of the winged nut 48 which causes the same to travel longitudinally of the threaded shank 42 moves the inclined faces 49 and 45 respectively of the winged nut 48 and the end of the tubular bearing 43 into engagement with the high point 50 on the inclined face of the winged nut engaged with the high point 46 on the tubular bearing 43 for shifting the tubular bearing and bracket plate carried thereby for positioning the ribs 15a on the supporting wall 12a in the recesses 16a in the bracket plate 17a to lock the bracket plate in position.

While there are herein shown and described the preferred embodiments of the invention, it is nevertheless to be understood that minor changes may be made therein without departing from the spirit and scope of the invention as claimed.

I claim:

1. In a support of the character described, a substantially rectangular supporting plate mounted on the upper end of a standard, a lug projecting from the supporting plate, a bracket plate having an opening therein adapted for reception of said lug and for mounting and support on the supporting plate, said support adapted to have a lawn mower head clamped on the bracket plate independently of the supporting plate and said bracket plate adapted to have its normal upper edge selectively positioned at one of the sides of the supporting plate for presenting either of the sides or ends of the lawn mower head at the upper side of the supporting plate the cooperative configurations of the supporting plate lug and bracket plate opening being such as to hold the bracket plate in its adjustably supported position.

2. In a support of the character described, a substantially rectangular supporting plate mounted on the upper end of a standard, a lug projecting from the supporting plate, a bracket plate having an opening therein adapted for reception of said lug and for mounting on the supporting plate, said support adapted to have a lawn mower head clamped on the bracket plate and said bracket plate adapted to have its normal upper edge selectively positioned at one of the sides of the supporting plate for presenting either of the sides or ends of the lawn mower head at the upper side of the supporting plate, and clamping devices for holding the lawn mower head on the bracket plate including a three-point clamp engageable with the tie rod of the mower head and a clamp engaged with the mower head roller.

3. In a support of the character described, a substantially rectangular supporting plate mounted on the upper end of a standard, a lug projecting from the supporting plate, a bracket plate having an opening therein adapted for reception of said lug and for mounting on the supporting plate, said support adapted to have a lawn mower head clamped on the bracket plate and said bracket plate adapted to have its normal upper edge selectively positioned at one of the sides of the supporting plate for presenting either of the sides or ends of the lawn mower head at the upper side of the supporting plate, and clamping devices for holding the lawn mower head on the bracket plate including a three-point clamp at the upper end of the bracket plate engageable with the tie rod of the mower head and a clamp at the lower end of the bracket plate engaged with the mower head roller.

4. In a support of the character described, a substantially rectangular supporting plate mounted on the upper end of a standard, a lug projecting from the supporting plate, a bracket plate having an opening therein adapted for reception of said lug and for mounting on the supporting plate, said support adapted to have a lawn mower head clamped on the bracket plate and said bracket plate adapted to have its normal upper edge selectively positioned at one of the sides of the supporting plate for presenting either of the sides or ends of the lawn mower head at the upper side of the supporting plate, and clamping devices for holding the lawn mower head on the bracket plate including a cross arm on the upper end of the bracket plate having a U-shaped clamp at each end engaged with one side of the tie rod of the mower head, a resilient clamp on the bracket plate engageable with the other side of said tie rod between the U-shaped clamps, and a clamp for the mower head roller carried by the lower end of the bracket plate.

5. In a support of the character described, a substantially rectangular supporting plate mounted on the upper end of a standard, a lug projecting from the supporting plate, a bracket plate having an opening therein adapted for reception of said lug and for mounting on the supporting plate, said support adapted to have a lawn mower head clamped on the bracket plate and said bracket plate adapted to have its normal upper edge selectively positioned at one of the sides of the supporting plate for presenting either of the sides or ends of the lawn mower head at the upper side of the supporting plate, and clamping devices for holding the lawn mower head on the bracket plate including a cross arm on the upper end of the bracket plate having a U-shaped clamp at each end engaged with one side of the tie rod of the mower head, a resilient clamp on the bracket plate engageable with the other side of said tie rod between the U-shaped clamps, and a clamp for the mower head roller carried by the lower end of the bracket plate including a screw rod, the roller clamp being slidable thereon and a nut threaded on the screw rod for moving the clamp into engagement with the roller.

6. In a support of the character described, a substantially rectangular supporting plate mounted on the upper end of a standard, a lug projecting from the supporting plate, a bracket plate having an opening therein adapted for reception of said lug and for mounting on the supporting plate, said support adapted to have a lawn mower head clamped on the bracket plate and said bracket plate adapted to have its normal upper edge selectively positioned at one of the sides of the supporting plate for presenting either of the sides or ends of the lawn mower head at the upper side of the supporting plate, and clamping devices for holding the lawn mower head on the bracket plate including a cross arm on the upper end of the bracket plate having a U-shaped clamp at each end engaged with one side of the tie rod of the mower head, a resilient clamp on the bracket plate, engageable with the other side of said tie rod between the U-shaped clamps, and a clamp for the mower head roller carried by the lower end of the bracket plate, including a screw rod, the roller clamp being slidable thereon and a nut threaded on the screw rod for moving the clamp into engagement with the roller, said screw rod being downwardly inclined.

7. In a support of the character described, a substantially rectangular supporting plate mounted on the upper end of a standard, a lug projecting from the supporting plate, a bracket plate having an opening therein adapted for reception of said lug and for mounting on the supporting plate, said support adapted to have a lawn mower head clamped on the bracket plate and said bracket plate adapted to have its normal upper edge selectively positioned at one of the sides of the supporting plate for presenting either of the sides or ends of the lawn mower head at the upper side of the supporting plate, and clamping devices for holding the lawn mower head on the bracket plate including a cross arm on the upper end of the bracket plate having a U-shaped clamp at each end engaged with one side of the tie rod of the mower head, a resilient clamp on the bracket plate, engageable with the other side of said tie rod between the U-shaped clamps, and a clamp for the mower head roller carried by the lower end of the bracket plate including a screw rod, the roller clamp being slidable thereon and a nut threaded on the screw rod for moving the clamp into engagement with the roller, said screw rod extending at right angles from the bracket plate.

8. In a support of the character described, a supporting plate mounted on the upper end of a standard, a bracket plate interlockingly suspended on the supporting plate, said support adapted to have a lawn mower head clamped onto the bracket plate independently of the supporting plate and said bracket plate adapted to have its normal upper edge selectively positioned adjacent the top, bottom and side edges of the supporting plate for presenting either of the sides or ends of the lawn mower head at the upper side of the supporting plate.

9. In a support of the character described, a supporting plate mounted on the upper end of a standard, a bracket plate interlockingly connected to the supporting plate, said support adapted to have a lawn mower head clamped onto the bracket plate and said bracket plate adapted to have its normal upper edge selectively positioned adjacent the top, bottom and side edges of the supporting plate for presenting either of the sides or ends of the lawn mower head at the upper side of the supporting plate, said interlocking connection including cooperating ribs and recesses on the opposed faces of the supporting and bracket plates, a stub shaft carried by the supporting plate, a rotatable and slidable tubular bearing on the stub shaft for the support of the bracket plate and cooperating cam devices carried by the tubular bearing and stub shaft for moving the bracket plate into engagement with the supporting plate.

10. In a support of the character described, a supporting plate mounted on the upper end of a standard, a bracket plate interlockingly connected to the supporting plate, said support adapted to have a lawn mower head clamped onto the bracket plate and said bracket plate adapted to have its normal upper edge selectively positioned adjacent the top, bottom and side edges of the supporting plate for presenting either of the sides or ends of the lawn mower head at the upper side of the supporting plate, said interlocking connection including cooperating ribs and recesses on the opposed faces of the supporting and bracket plates, a stub shaft carried by the supporting plate, a rotatable and slidable tubular bearing on the stub shaft for the support of the bracket plate and cooperating cam devices carried by the tubular bearing and stub shaft for moving the bracket plate into engagement with the supporting plate, including a cam wall on the outer end of the tubular bearing, a threaded shank carried by the stub shaft and a cam wing nut engageable with the cam end of the tubular bearing.

ARTHUR MARVIN COLLOT.